June 23, 1942.                R. F. TABER                2,287,148
                  WEAR AND HARDNESS TESTING INSTRUMENT
                  Filed May 20, 1938          4 Sheets-Sheet 1
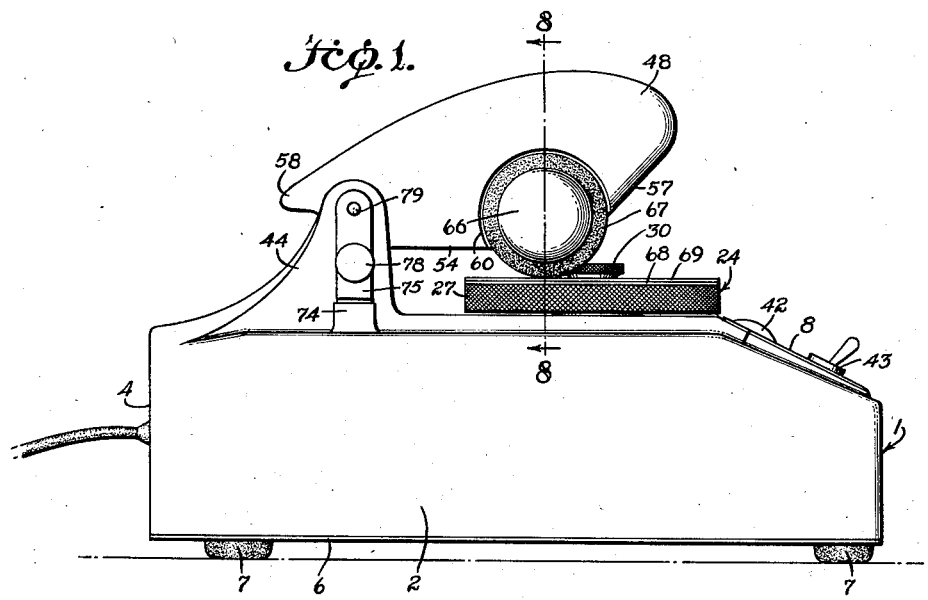
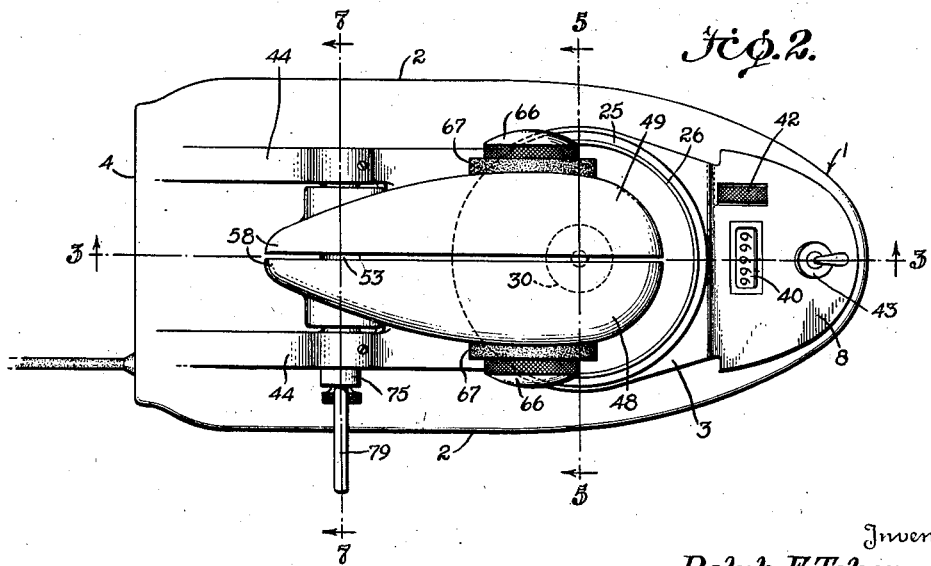
Inventor
Ralph F. Taber,
By
    Attorney Inventor
Ralph F. Taber,
By
Attorney June 23, 1942.   R. F. TABER   2,287,148
WEAR AND HARDNESS TESTING INSTRUMENT
Filed May 20, 1938   4 Sheets-Sheet 3
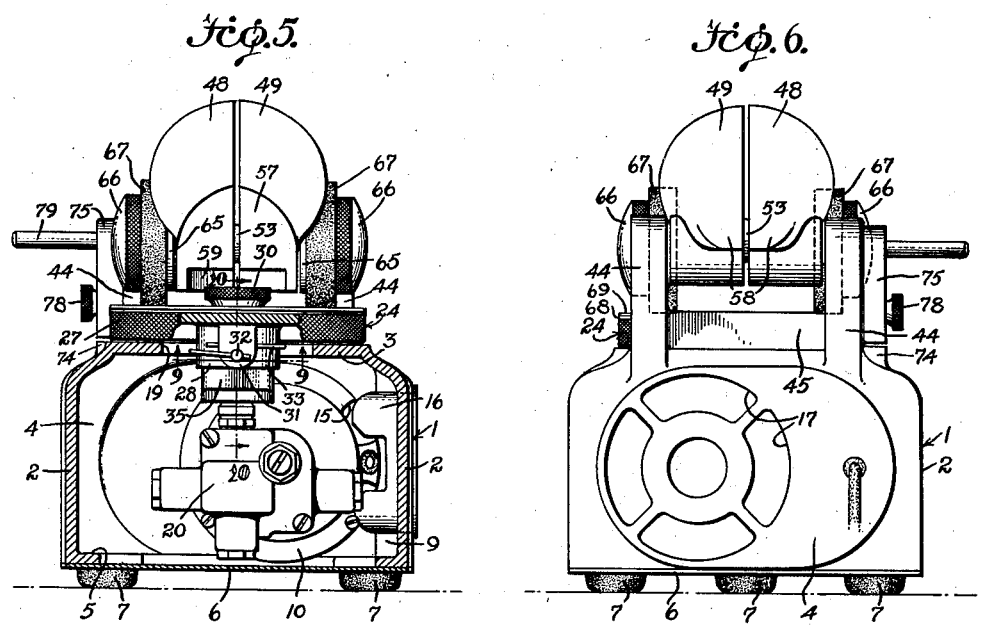
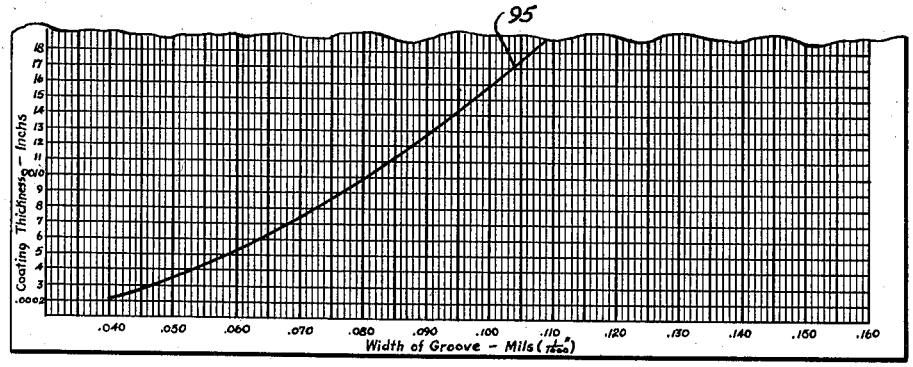
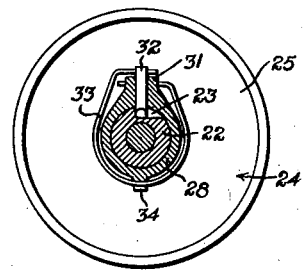
Inventor
Ralph F. Taber, June 23, 1942.  R. F. TABER  2,287,148
WEAR AND HARDNESS TESTING INSTRUMENT
Filed May 20, 1938  4 Sheets-Sheet 4
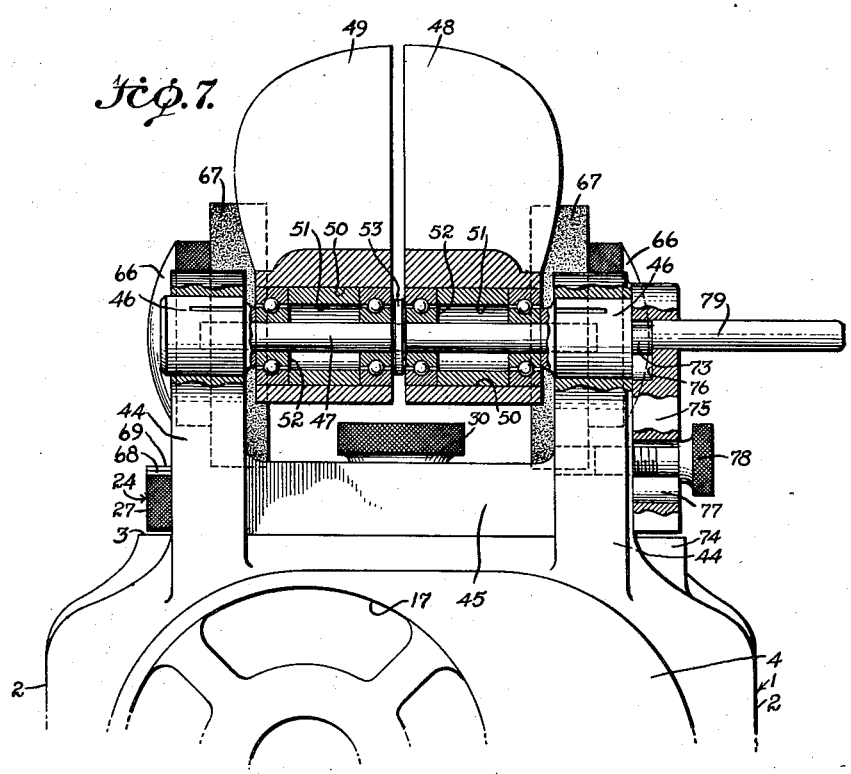
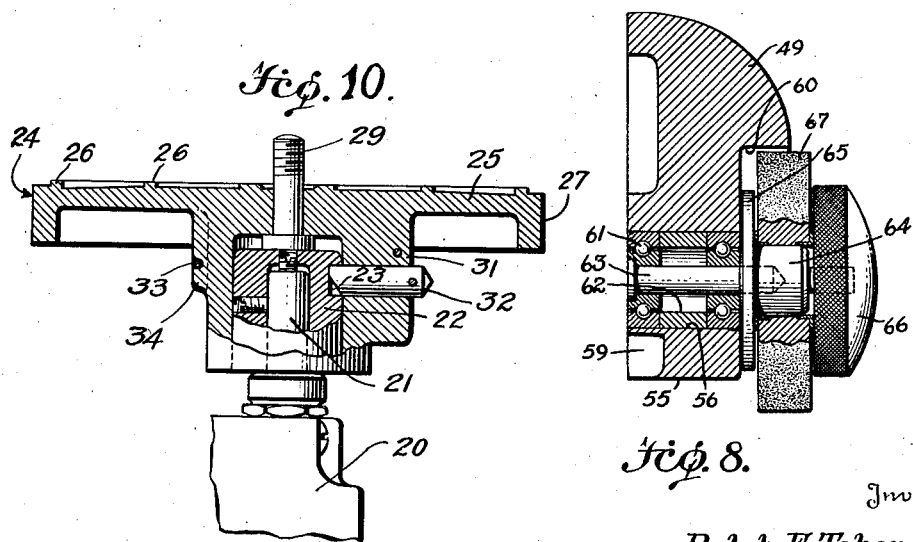
Inventor
Ralph F. Taber,
By
Attorneys Patented June 23, 1942

2,287,148

UNITED STATES PATENT OFFICE 2,287,148

WEAR AND HARDNESS TESTING INSTRUMENT

Ralph F. Taber, North Tonawanda, N. Y.

Application May 20, 1938, Serial No. 208,953

12 Claims. (Cl. 73—51)

The invention provides means for testing the wearing qualities of thin sheet material and finishes of various kinds, such as varnishes, lacquer, paint, electro-plate, and other similar coatings used as a surface finish on paper, metal and wood.

This invention provides a testing instrument having a suitable supporting structure carrying a specimen support operable to drive the specimen for producing surface travel of the surface of the specimen through the medium of suitable means carried by the support, while the support also carries wearing elements mounted so they may be freely moved into and out of engagement with the surface of a test specimen on the specimen support for producing surface wear of the specimen.

The testing instrument of this invention has a structure wherein a suitable housing carries a power unit for driving a specimen support to produce surface travel of a specimen thereon in contact with a pair of wear wheels rotatably mounted on hinged arms carried by the housing and arranged to provide surface wear on the same area of the specimen through the driving of the wheels from the specimen, in order to wear the specimen away to determine the wearing qualities thereof.

The invention further provides a housing structure for the instrument carrying the driving means, preferably in the form of an electric motor, with a suitable blower system to circulate air through the housing as well as the motor, to keep the motor cool, and to supply air for keeping the specimen cool during the test.

The invention comprehends a structure where the pair of arms pivotally mounted on the housing carries wear wheels in spaced parallel relation for movement into surface contact with a wear specimen movably mounted on the housing, the arms being constructed to provide a desired amount of weight, acting to urge the wheels into contact with the surface of the wear specimen, so as to wear through the surface of the specimen, the mass of the arms being distributed in such a manner that a full view of the operation of the wear wheels will be had from a position in front of the instrument. The pair of arms in providing a weighted support for the wheels are constructed oppositely to one another and arranged in adjacent relation so they will have a combined outline presenting rounded surfaces that increases in size toward the central portion of the arms and decrease into rounded and pointed ends providing a combined streamlined appearance.

The invention provides a means for testing the wearing qualities of thin coating materials which consists in alternately rubbing the surface of a specimen in angular relation throughout a series of substantially equal sections in which the wearing of the surface is continued in cycles until the coating is worn through, counting the number of cycles that it requires for the wearing out of the film in each section and subsequently averaging the number of cycles to obtain the average amount of wear that the film will withstand.

The invention further comprehends a testing instrument wherein a plurality of wearing elements are engaged in surface contact with the surface of a wear specimen suitably driven to provide surface travel of said specimen and to transmit motion to drive the wearing elements for wearing through the test specimen.

In the drawings:

Fig. 1 is a side elevation of the testing instrument forming the present invention.

Fig. 2 is a plan view.

Fig. 5 is a cross section taken on line 5—5 of Fig. 2 with portions left in elevation and other parts only partly broken away and shown in section, for clearness in illustrating details of construction.

Fig. 6 is an end elevation of the rear end of the instrument.

Fig. 7 is an enlarged cross section taken on line 7—7 of Fig. 2, illustrating the detailed structure of the pivot mounting for the pair of arms supporting the wearing elements.

Fig. 8 is an enlarged detailed cross section taken on line 8—8 of Fig. 1 showing how the wearing elements are mounted on the arms.

Fig. 9 is a cross section taken on line 9—9 of Fig. 5 illustrating how the specimen supporting disc is mounted on the drive shaft.

Fig. 10 is a cross section taken on line 10—10 of Fig. 5 to further illustrate the details of the mounting of the specimen supporting disc on the drive shaft and the details of construction thereof.

Fig. 12 shows a fragment of a chart illustrating coating thicknesses for the various widths of grooves produced by the cutter.

Figure 3:
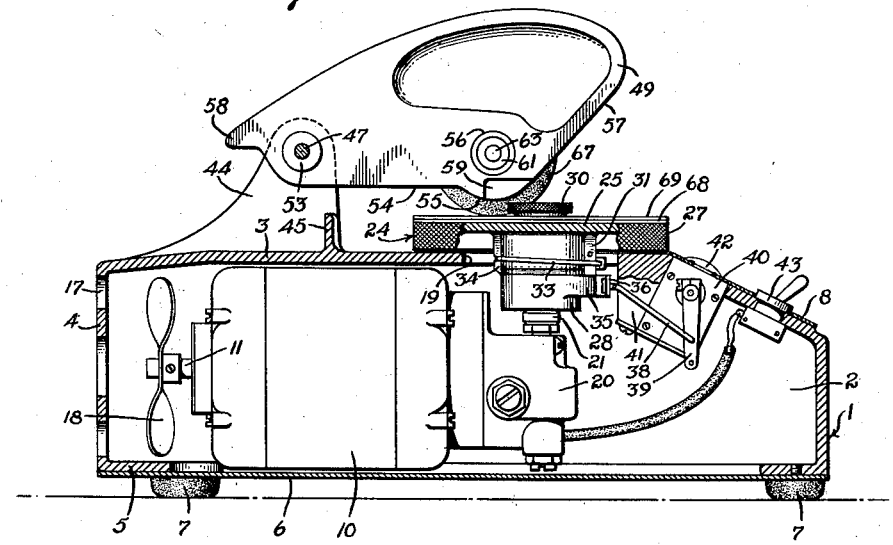
Fig. 3 is a longitudinal cross section taken on line 3—3 of Fig. 2, portions of the parts being shown in elevation and other portions partly illustrated in section.

The instrument has a housing 1 providing a support to carry and house a number of parts of the instrument. This housing 1 has side walls 2, top wall 3, rear wall 4 and bottom flange 5 defining an opening into the housing through the bottom, and providing a support for receiving detachable bottom plate 6 and a plurality of supporting feet 7. Side walls 1 merge into a curved front portion with an inclined wall 8 joining the top wall with this curved front portion and the side walls.

Figure 4:
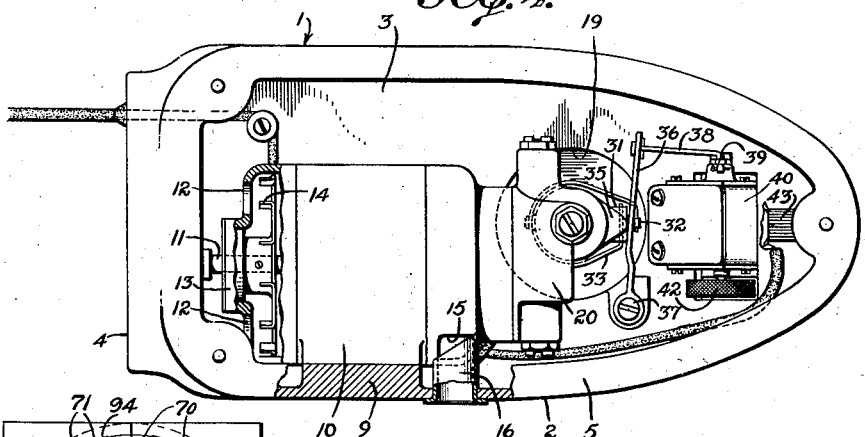
Fig. 4 is a bottom plan view of the instrument with the bottom wall or cover plate removed, and with portions of the motor casing and side wall of the housing broken away and shown in section to illustrate details of construction.

One of the side walls 2 is formed near the rear end with an inwardly extending projection or platform 9, see Fig. 4, formed to rigidly mount electric motor 10 thereon. Motor 10 is a conventional type of electric motor having an armature shaft 11, and openings 12 in the rear end of the motor casing arranged in circumferential relation about the rear bearing portion 13 for armature shaft 11. These openings 12 provide air inlet openings into the motor and a fan 14 is provided in the rear end of the motor on armature shaft 11 for drawing air in through openings 12 and circulating it through the motor. The opposite end of motor 10 is provided with an exhaust opening 15 adjacent to projection 9 as shown in Fig. 4. Side wall 2 adjacent the projection 9 is formed with an opening receiving an outlet conduit 16 engaged in opening 15, so exhaust air from the interior of the motor may pass through conduit 16 and outwardly through side wall 2.

Rear wall 4 as shown in Fig. 6 is provided with a plurality of openings 17 forming an air inlet at one side of the rear wall in alignment with motor 10. A fan 18 as shown in Fig. 3, is mounted on the rear end of armature shaft 11 and arranged to circulate air in the housing taken in through air inlet 17, so a portion of this air circulates through motor 10 in the manner above described while the remaining portion of the air is circulated about motor 10 toward the front end of the housing where it ultimately finds exhaust through opening 19 in top wall 3. There are therefore two air passages or conduits, one formed by the housing and the other by the motor.

The front end of motor 10 carries a reduction gear unit 20 of conventional form driven by armature shaft 11. This unit includes a shaft 21 extending vertically through opening 19 in top wall 3. A cap 22 is adjustably mounted on the upper free end of shaft 21 for axial adjustment on the shaft by operation of an axially arranged adjustment screw, see Figs. 9 and 10. A radial set screw rigidly locks the cap in adjusted position. A recess 23 is formed in the cap for a purpose that will now be described.

A specimen holder 24 has a specimen supporting disc portion 25 provided with inner and outer annular ribs 26 projecting upwardly from the upper face thereof as shown in Fig. 10. The upper face of disc portion 25 between inner and outer ribs 26 is tapered slightly so that the portion adjacent the outer rib 26 is in a plane slightly below the portion adjacent the inner rib. This slight incline on the face of disc portion 25 is used during the re-facing of the wear elements in a manner that will be hereinafter described. The incline between ribs 26 found most practical has a drop at the outer edge thereof approximately three-thousandths of an inch below the inner edge, while the surface of the inner rib is approximately three-thousandths of an inch higher than the adjacent portion of the inclined surface between the ribs. The upper faces of both ribs 26 are in the same horizontal plane.

There is a depending annular flange on the margin of disc portion 25 indicated at 27, the lower edge of which terminates in close relation to the upper face of top wall 3. The central portion of disc 25 has a depending tubular hub 28 that slidably engages over cap member 22 on shaft 21. A retaining screw 29 is mounted in disc 25 so as to extend through the center and has the threaded end thereof project above disc portion 25 to receive a knurled retaining nut 30 adapted to clamp test specimens on disc 25. A projection 31 is formed on tubular hub 28 and has a radially extending passage to slidably receive clutch pin 32 normally urged inwardly by spring 33, one end of which engages pin 32 while the opposite end is formed to encircle hub 28 and extend through an opening in projection 31, while the central portion thereof is supported on the opposite side of hub 28 in the slot in projection 34. Clutch pin 32 is arranged to engage in recess 23 of cap 22 to transmit driving power from shaft 21 to rotate specimen holder 24.

Projection 31 is formed below the portion receiving clutch pin 32 to provide a cam 35 adapted to engage lever 36 pivoted at one end as indicated at 37 on the under side of top wall 3 while the opposite end is provided with a link connection 38 to actuating arm 39 of a suitable conventional counting device 40. This counter 40 is operated to register the number of revolutions made by the specimen supporting member during operation of the testing instrument. Conventional counters of the character indicated by numeral 40 utilize as many indicating or registering wheels as may be necessary to show the number of cycles of operation in units, tens, hundreds, thousands, etc., and also include a re-setting device of suitable type. It is to be understood that the counter 40 may involve these features of construction and any others common with conventional counters. The counter is mounted as shown in Fig. 3 on projection 41 depending from the underside of top wall 3 adjacent inclined wall 8, while the indicating portion of the counter projects through an opening formed in inclined wall 8. A re-setting knob for the counter is shown at 42 in Fig. 2.

A motor control switch 43 is mounted on inclined wall 8 adjacent to counter 40, and is connected in circuit with motor 10 and a power supply line through flexible cable connection provided with a suitable plug at the free end, not shown, adapted for insertion in the usual receptacles used in offices, laboratories, etc. for connecting portable electric apparatus with a power supply circuit.

The top of housing 1 is provided with a pair of spaced parallel bearing projections 44 on the rear end portion having an upwardly extending flange 45 extending between said projections and forming a stop. The upper ends of bearing projections 44 are formed with axially aligned openings receiving split shaft supporting bushings 46 held in adjusted position in said projections 44 by set screws. The split ends of these bushings are directed inwardly toward each other and have axially arranged sockets to receive opposite ends of shaft 47. This shaft mounts a pair of arms 48 and 49 for independent pivotal movement, in coaxial relation. Arms 48 and 49 have one end of each provided with transversely extending openings 50 larger than and receiving shaft 47. A spacing sleeve 51 is fitted into the central portion of each opening 50 and ball bearing units 52 are fitted in the ends of bore 50 in each arm against the ends of spacing sleeves 51, in such a way, that the outer raceway of each bearing unit engages spacing sleeve 51, while the inner raceway of each unit is mounted on shaft 47. A spacing collar 53 is placed between the adjacent ball bearing units 52 of the pair of arms to space them a slight distance apart.

When bearing units 52 are assembled on shaft 47 and engaged in bores 50 of the two arms, so as to engage the ends of spacing sleeve 51, and spacing collar 53 is in place between the arms, these parts may then be engaged between shaft supporting bushings 46 with the ends of shaft 47 engaged in the sockets. Shaft supporting bushings 46 may then be moved toward each other in projections 44 to such an extent that they will take up all lost motion in ball bearing units 52 and mount arms 48 and 49 for accurate free pivotal movement in spaced parallel coaxial relation on shaft 47. When this adjustment of shaft bushings 46 has been obtained, the set screws for rigidly fixing the position of bushings 46 are operated to lock the bushings in position for maintaining this adjustment.

Figure 11:
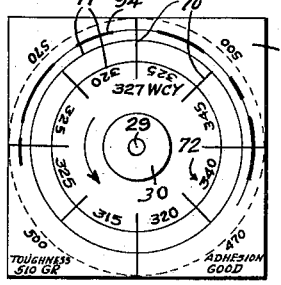
Fig. 11 is a plan view of a test specimen illustrating how the test specimen may be divided in a plurality of segments so that wear on different segments of the specimen can be compared.

Arms 48 and 49 are formed in pairs, each arm of a pair being formed in opposite relation to the other. In side elevation each of the arms has an outline of irregular shape as can best be determined by reference to Figs. 1 and 3. The portion of each arm that is normally at the bottom is formed with a straight portion 54 terminating in a rounded portion 55 provided with a transversely extending bore 56. The forward end of the arm extends upwardly as indicated at 57 in acute angular relation from rounded portion 55 to provide a substantially sharp incline at the front or free end of the arm where it overhangs specimen holder 24, so that a clear view of the specimen on member holder 24 will be obstructed as little as possible. From the upper end of inclined portion 57 the free end and the top portion of each of the arms 48 and 49 is rounded and this curved or rounded portion merges into a long curved portion extending rearwardly toward the pivot mounting for the arm so as to gradually decrease the width of the arm from top to bottom toward the rear end shown at the left in Fig. 3. At the rear end each arm terminates in a projection 58 extending to the opposite side of shaft 47 from the major portion of the arm, a sufficient distance, so that when the arm is moved about the shaft and the free end moves away from specimen holder 24, projection 58 will engage flange 45 and support the arms in a rearwardly inclined position as shown in Fig. 11. Since the arms are mounted in pairs in close adjacent relation, the adjacent faces are substantially flat and arranged in parallel relation, the free end of each arm having the adjacent face provided with a shallow recess, as shown.

The remaining surface of each arm is rounded as clearly illustrated in the drawings so that an outline in cross section, of each arm, will present a straight line for the adjacent portions, while the remainder of each arm is rounded from the top to the bottom and tapered longitudinally from the central portion toward each end, the rounded faces of each arm being made to correspond so that the pair of arms together provide a streamlined appearance. Rounded portion 55 of each arm is recessed at 59 to prevent the arm from coming in contact with nut 30 in the operation of the instrument. The outer side of the arms 48 and 49 in line with bore 56 is recessed as indicated at 60 so that the outer face of the arm in the recess is flat and parallel to the inner or adjacent face, as may be determined from Fig. 8.

A pair of ball bearing units 61 having inner and outer raceways are mounted at opposite ends of bore 56 in each arm and separated by spacing collar 62. The outer raceways of these bearing units 61 have a driving fit in bore 56. A shaft 63 provided with a head at the inner end, is mounted in the inner raceways of bearing units 61 with the head on the inner end engaging the inner raceway of the inner bearing unit. The opposite end of shaft 63 extends through the inner raceway in the outer bearing unit and into recess 60 where it mounts a hub member 64 having a flange 65. The outer end of hub member 64 is provided with a reduced threaded extension to receive a retaining nut 66. An annular abrasive disc or wear element 67 is provided with a central opening adapted to fit on hub 64 so that this wear element may be retained on the hub by means of nut 66 to rotate therewith on shaft 63. Two wear elements or wheels are provided, one on each hub 64.

The axes of each shaft 63 and each wear element 67 is equidistant from the pivot axis for arms 48 and 49 on shaft 47. In all positions of arms 48 and 49, the axes of shafts 63 therein are always in parallel relation, and also parallel to specimen holder 24. The shape of arms 48 and 49 not only provides a fixed amount of weight to urge wear elements 67 toward specimen holder 24, but they also provide a convenient structure, so the arms can be manually gripped for movement into either the operative or inoperative position.

Wear elements or wheels 67 are made readily removable from hub 64 in order that they may be readily changed for new elements whenever they wear out or wear off to such an extent that it is no longer practical to use them. These wear elements are preferably made from a rubber composition material containing a suitable quantity of abrasive grains. For this reason the peripheries will wear out rather rapidly in view of which the removable mounting on the hub provides for quick replacement.

In order to use the wear elements 67 it is preferable to obtain more uniformity in making a test, to dress the peripheries thereof, before proceeding to wear test a specimen. In order to do this, a piece of fine abrasive cloth or paper is placed upon turntable or specimen holder 24 and clamped on the upper surface thereof against rotation by means of nut 30. The diameter of the abrasive cloth or paper disc is less than the outer rib 26 so that the disc will lie substantially flat on the inclined surface between ribs 26. Arms 48 and 49 are moved to engage the peripheries of wear elements 67 with the upper surface of this abrasive cloth or paper. Switch 43 is operated to start the motor and the turntable 24 rotates with the wheels riding on the surface of the abrasive paper or cloth, being driven by the turntable through the abrasive paper or cloth. Since the portion of the periphery of each wear element 67 that engages with the surface of the abrasive cloth travels in the rotation of each element in a direction that is at an acute angle to the direction of surface travel of the abrasive cloth thereunder, in the rotation of turntable 24, a rubbing action will result on the periphery of each wheel, so that the abrasive cloth will remove a portion of the periphery of each wheel in the operation of the instrument. Due to the fact that the surface of the disc portion 25 between ribs 26 is slightly inclined as heretofore described, the weight of arms 48 and 49 causes wear elements 67 to press the abrasive cloth onto the inclined face of disc 25 and as a result the peripheries of each wear element will be removed or dressed so that the diameter of the outer edge will be slightly larger than that of the inner edge, and the peripheral surface will be slightly tapered. Due to the resiliency of wearing elements 67 and the greater amount of material on the specimen adjacent the outer edge of the wear pattern made by said elements, the slight taper on the periphery has been found to produce substantially uniform wearing of the surface of a test specimen in the area defined by concentric circles 71. This allows the use of wear wheels having a wide wearing periphery and in this way obtains marked improvement in the wear testing operation as compared with the results produced when narrow wear wheels are used. For example, a wear wheel having a one-half inch wide wearing surface may be used.

After wearing elements 67 are dressed in the manner described, arms 48 and 49 are moved to the upper position with projections 58 engaged against flange 45. The abrasive cloth or paper is removed from specimen holder 24. A rubber or similar disc 68 is then applied to the upper face of specimen holder 24 and a specimen plate 69 is applied on top of disc 68 and nut 30 applied to rigidly and firmly retain disc 68 and specimen plate 69 on holder member 24. This rubber disc 68 may also be used in the dressing of the wear elements as it has been found to work very well in the dressing operation so that subsequent wear testing will produce more uniform results.

Specimen plate 69 is preferably a piece of heavy gauge sheet metal that is substantially flat. In the drawings it is shown as square, but obviously may be of any desired shape. Specimen plates of this character are coated with the desired lacquer, paint or other coating material, electro-plate, etc., that is to be tested. Previous to applying this specimen plate with the coating thereon to the testing machine, the coating is preferably scribed or marked in any suitable manner to divide the surface into a plurality of segments. Marks for this purpose are indicated at 70 in Fig. 11. The center of specimen plate 69 is provided with an opening to fit over screw 29 so that the plate is centered on holder 24.

When the specimen plate is applied to the testing instrument arms 48 and 49 are moved into position shown in Fig. 1, so the peripheries of wear wheels or elements 67 will engage the coated surface of wear specimen 69. By operating switch 43 to energize motor 19, specimen holder 24 is rotated and counter 40 is operated to register the number of revolutions of holder 24 in the manner heretofore described.

The peripheries of wear elements 67 contact the surface of the coating in an area spaced rearwardly from a transverse plane passing through the axis of rotation of holder 24. By reason of being spaced equi-distances on opposite sides of a longitudinal plane through the axis of rotation of the holder, and their parallel relation to each other with their axes of rotation equi-distant from the pivot mounting for arms 48 and 49, it will be understood, that the peripheries of wear elements 67 on the respective arms will engage and alternately ride on the same surface area of the coating on specimen 69 so as to alternately produce wear on this area. The production of this wear on the same area is obtained through elements 67 being rotated by means of the specimen plate driven from the motor.

The specimen coating has surface travel due to holder 24 supporting and rotating the specimen in the plane of its surface. The direction of travel of the specimen surface in contact with the periphery of each wear element or wheel 67 is at an acute angle to the direction of travel of the periphery of the wear element at the point of contact therewith. In the case of wear element 67 on arm 49, as viewed in Figs. 2 and 11, the surface of the specimen will move toward the lower left-hand corner of the sheet as shown in the drawings where the periphery of wear element 67 contacts therewith. As a result, the surface of the specimen travels in acute angular relation to the direction of travel of the periphery of wear element 67 on arm 49, and the surface of wear element 67 on arm 49, travels at the point of contact with the specimen toward the left-hand side of the sheet, as shown in Figs. 2 and 11. This produces a wiping action on the specimen from what may be described as the inside toward the outside edge of the specimen and wears an area delineated by the concentric circles 71.

Wear element 67 on arm 48 produces wear on the same area delineated by the concentric circles 71, in the same manner as the wear element on arm 49, except that the periphery of wear element 67 on arm 48 at the point of contact with the specimen surface, moves toward the right as shown in Figs. 2 and 11, and produces a rubbing action on the surface from the outside toward the center in acute angular relation. This produces a wearing action in which any scratches produced by one wear element are caused to cross the scratches that are produced by the other wear element, and thereby presents a more natural wearing action on the specimen than would result where both wear elements would rub in the same direction, so that scratches produced by each would be in alignment and have the effect of deeping one another. The acute angular relation employed for this wearing action between the contacting portions of the peripheries of wear elements 67 and the surface of specimen 69 may be varied between 15 and 60 degrees, although it is found more desirable to employ an angular relation in the neighborhood of 30 degrees.

The instrument is allowed to operate until wear elements 67 wear out or wear through the thickness of the coating so that the surface of the specimen plate shows through the coating. The operation may be limited, whenever desired, so the wear extends only through a portion of the coating sufficient to obtain measurement of wear on a unit thickness. Due to the fact that coatings vary in thickness it is likely that portions of the coating in the wear track or pattern included between concentric circles 71 will wear through before other portions thereof. It is for this reason that the specimen is divided by marks 70 into segments so that when the coating is worn through on one segment switch 43 may be moved to the "off" position to stop the motor and holder 24, while the number indicated on register 40 is marked on the specimen to indicate the duration of wear of the coating in the segment that has just worn through. Such a record is indicated on specimen 69 in Fig. 11 at 72. The switch is then moved to the "on" position and the wear on the specimen continued until the coating it worn out in all segments, holder 24 being stopped each time the coating is worn off of the specimen plate over each segment to record the wearing endurance in each segment.

When this wearing operation is complete, with the wear for each segment recorded on the specimen, the average wear for the specimen can be calculated by averaging the results for all of the segments.

Before a new specimen is placed on holder 24 for making another test, wear elements 67 are dressed with abrasive paper in the manner above described. Where a coating is unusually tough and takes considerable time to wear it through to the specimen plate, it may be found desirable to stop the machine at intervals, remove the specimen plate, and dress wear elements 67 in the manner above described; then replacing the specimen and continuing the wearing operation. It is also desirable in some instances to first coat the specimen plate with a colored layer that will contrast with the color of the coating applied on specimen plate 67 for test purposes. This provides a desirable means for visually determining when wear elements 67 have worn through the coating.

In order to obtain information to show the amount of wear per unit thickness of coating for comparing the wearing qualities of different kinds of coatings, it is necessary to determine the amount of wear a coating will withstand per unit of thickness. It is, therefore, necessary to measure the thickness of coating on specimen plate 69 either before or after the wearing operation.

Bearing projection 44 at the left-hand side of the housing, or at the bottom, as the instrument is viewed in plan in Fig. 2, has shaft mounting bushing 46 provided with a projection 73, while the base of said bearing projection is formed with gauge shoulder 74 on the outer side in vertical alignment with projection 73. A bearing bar 75 is provided with slot 76 to slidably engage projection 73 and a slot 77 receiving set screw 78 threaded into bearing projection 44 and manually operable to lock bearing bar 75 in any position of adjustment between the ends of the slots.

When a satisfactory groove has been cut by cutting an arcuate groove through the coating, the thickness of the coating may then be measured by measuring the width of the groove manually with a micrometer preferably graduated in thousandths of an inch and then by reference to a chart as illustrated in Fig. 15 the thickness of the coating may be determined by the graph 95 on the chart. It will be noted in Fig. 15 that the abscissas of the chart are represented in groove width while the ordinates show coating thickness. In this way a comparison of the coating thickness with the results obtained as hereinabove described from a wear test on the specimen will indicate the duration of wear of a unit thickness of the coating.

It will be understood that by reason of mounting arms 48 and 49 in coaxial relation, side by side, and having the axes of rotation of wear elements 67 parallel to the axis of mounting of said arms, the peripheries of both wear elements 67 will always remain in the same plane regardless of their position with respect to the pivot axis for arms 48 and 49, and by reason of this relation, variations in the thickness of specimen or the size of the wear elements will not change the plane of the wearing periphery of the wear elements with respect to a specimen surface. Uniform results are therefore secured in all positions of arms 48 and 49 in a wear test on a specimen carried by holder 24.

By having the inclined faces on the front edges of arms 48 and 49, the major portion of the surface of a specimen can be viewed and the wear track inspected at all times. Shavings made in the testing operation may be brushed off the specimen surface from time to time during the operation by reason of the clear view of the specimen provided by the structure of arms 48 and 49. The circulation of air through the motor and also through the housing prevents the motor from overheating, and also dissipates heat created in wearing a specimen through the discharge of air from the casing through opening 19 against the underface of disc 25 of holder 24, the air exhausting between the upper face of top wall 3 on the housing and the lower edge of flange 27. This ventilating and cooling system maintains the specimen at substantially normal temperature, so that the wear test is conducted under normal use conditions of a coating.

The invention claimed is:

1. A wear testing machine, comprising a support, a movable specimen holder for producing surface travel of a specimen mounted thereon, means for driving said holder, a pair of movable wearing means having travelling wearing surfaces with a portion of each engaged with spaced portions of the surface of said specimen and driven through said specimen and holder by said driving means, said wearing means having the surfaces thereof travelling at an acute angle to said specimen surface during contact therewith, the angle of travel of the surface of one wearing means relative to the direction of travel of the specimen surface being opposite to the angle of travel of the surface of the other wearing means, each wearing means alternately producing wear on the same surface area of said specimen, and means for registering the duration of wear on said specimen.

2. A wear testing machine, comprising a support, a rotatable specimen holder for producing circular surface travel of a flat specimen in the plane of its surface, means for turning said specimen holder and specimen, movable wearing elements having wearing surfaces with a portion of each engaged with spaced portions of the surface of said specimen and driven through contact therewith, said wearing elements having the surfaces thereof travelling in the same direction but at an acute angle to the direction of travel of the specimen surface during contact therewith, the angle of travel of the surface of one wearing element relative to the direction of travel of the specimen surface being opposite to the angle of travel of the other wearing surface, said wearing elements producing wear in alternate relation on the same circular surface area of said specimen, and means for registering the wear on said specimen.

3. A wear testing machine, comprising a support, a rotatable specimen holder for producing circular surface travel of a flat specimen in the plane of its surface, means for turning said specimen holder and specimen mounted on said support and having driving connections with said holder, wear wheels carried by said support having peripheral contact with spaced portions of the specimen surface and rotated through said contact by said means to produce peripheral surface travel of said wear wheels on said specimen surface, the direction of travel of the periphery of said wheels and specimen at the contacting portions being at acute angles, said angle of travel of one wheel periphery being opposite to that of the other, both wheels producing wear on the same circular surface area of the specimen, and means for registering the number of wear cycles in the operation of said machine on a specimen.

4. A wear testing machine, comprising a support, a rotatable specimen holding disc on said support for producing circular surface travel of a flat specimen in a horizontal plane, power driving means on said support connected to and rotating said disc and specimen in operation thereof, a pair of arms pivoted on said support movable toward and away from positions over said specimen, a pair of wear wheels, each rotatable on the free end of one arm and having peripheral engagement with spaced portions of the surface of said specimen, the direction of travel of the periphery of said wheels and specimen at the contacting portions being at acute angles, said angle of travel of one wheel periphery being opposite to that of the other, said wheels being rotated through contact with said specimen, said arms supporting said wheels in position in contact with said specimen to produce wear successively on the same annular surface area of said specimen in different directions and means for recording the number of wear cycles in the operation of said machine on a specimen.

5. A wear testing machine, comprising a support, a disc horizontally and rotatably mounted on said support for holding a flat specimen and producing circular travel of the surface in a horizontal plane, means carried by said support for rotating said disc, a pair of arms independently pivoted at one end in coaxial relation on said support and having the opposite ends movable toward and away from positions over said disc and specimen, a wear wheel rotatably mounted on each arm at equal distances from the pivot axis for said arms, the peripheries of said wear wheels engaging the surface of said test specimen at spaced positions, said wheels rotating in parallel planes at opposite sides of the parallel plane intersecting the axis of rotation of said disc and specimen, the peripheries of said wear wheels at the position of contact with said specimen surface having surface travel in acute angular relation to said specimen surface travel on the same annular surface area in alternate relation and in opposite directions, and means for recording the number of wear cycles in the operation of said machine on a specimen.

6. A wear testing machine, comprising a housing, a disc rotatably mounted over the top of said housing, spaced bearing supports on top of said housing, a pair of arms arranged in adjacent relation with coaxial pivot bearings in one end engaged between said bearing supports for pivotally mounting said arms in said supports, each arm having a substantially flat face and the remaining surfaces rounded, the cross sectional dimension of each arm being greater in the central portion and gradually decreasing toward the ends, said arms being mounted with the flat faces in adjacent opposed parallel relation, a wear wheel rotatably mounted on each arm in parallel relation for peripheral engagement with the surface of a wear specimen on said disc, and means in the housing for rotating said disc and said wear wheels, said wheels having the direction of travel of the peripheries thereof at the position of contact with said specimen surface in opposite acute angular relation to the direction of travel of said specimen surface.

7. A wear testing machine, comprising a housing, a specimen holder rotatably mounted over the top of said housing, spaced wearing means movably mounted on top of said housing having travelling wearing surfaces with a portion of each engaged with spaced portions of the surface of a specimen mounted on said holder, an electric motor in said housing for rotating said holder and operating said wearing means, a fan in said housing driven by said motor, an air intake for said fan, and an air exhaust in said housing under said holder for directing air from said fan against said holder to keep said specimen cool.

8. A wear testing machine, comprising a housing, a disc rotatably mounted over the top of said housing, spaced wearing means movably mounted on top of said housing having travelling wearing surfaces with a portion of each engaged with spaced portions of the surface of a specimen mounted on said disc, an electric motor drive for said disc and wearing means, an air inlet in said housing, means providing a pair of air passages from said inlet through said housing, one of said passages being through the motor and the other through the housing, and an outlet for said last-named passage under said disc so that air is discharged against said disc to cool the same, and fan means operated by said motor for circulating air in said passages.

9. A wear testing machine, comprising a housing, a disc rotatably mounted over the top of said housing, spaced wearing means movably mounted on top of said housing having travelling wearing surfaces with a portion of each engaged with spaced portions of the surface of a specimen mounted on said disc, an electric motor for driving said disc and wearing means, an air inlet in one end of said housing, an air outlet under said disc, an air outlet for said motor, separate conduits connecting said inlet with said outlets, a fan operated by said motor in said inlet for circulating air in both passages, and a fan in said motor for circulating air through said motor and out through the last-mentioned air outlet.

10. A wear testing machine, comprising a housing having top, side, bottom and end walls, said top wall having an opening formed therein, one end wall having an air intake opening and one of said side walls being formed to provide a motor platform, a motor mounted on said platform, a drive unit carried by said motor having a shaft projecting through the opening in said top wall, a disc mounted on said shaft above said top wall for supporting a wear specimen, spaced wearing means movably mounted on top of said housing having travelling wearing surfaces with a portion of each engaged with spaced portions of the surface of said wear specimen, said motor having an air inlet at one end adjacent the air inlet in said housing and an air outlet at the opposite end opening through a side of said housing, the interior of said housing forming an air passage between the air inlet in said end wall and the opening in said top wall, a fan in said motor operable thereby to circulate air therethrough, and a fan in said housing adjacent said air inlet therein operable by said motor to circulate air through said housing and out through the opening in the top against said disc.

11. A wear testing machine, comprising a housing having an opening in the top, an electric motor mounted in the housing, a speed reducing unit mounted on said motor, a shaft mounted in and driven by said motor through said unit, said shaft projecting upwardly through the opening in the top of said casing, a disc detachably mounted on said shaft for rotation therewith above the top of said housing, means for detachably securing a specimen for testing to said disc for rotation therewith, and spaced wearing means movably mounted on top of said housing having travelling wearing surfaces with a portion of each engaged with spaced portions of the surface of the specimen on said disc for wearing said specimen in the rotation of said disc.

12. A wear testing machine, comprising a housing having an opening in the top, an electric motor mounted in the housing, a speed reducing unit mounted on said motor, a shaft mounted in and driven by said motor through said unit, said shaft projecting upwardly through the opening in the top of said casing, a disc detachably mounted on said shaft for rotation therewith above the top of said housing, means for detachably securing a specimen for testing to said disc for rotation therewith, a counter on said casing, a cam on said disc for operating said counter in each rotation thereof, and spaced wearing means movably mounted on top of said housing having travelling wearing surfaces with a portion of each engaged with spaced portions of the surface of the specimen on said disc for wearing said specimen in the rotation of said disc.

RALPH F. TABER.